US009964275B2

(12) United States Patent
Lee et al.

(10) Patent No.: US 9,964,275 B2
(45) Date of Patent: May 8, 2018

(54) HEAD LAMP FOR VEHICLE

(71) Applicant: Hyundai Mobis Co., Ltd., Seoul (KR)

(72) Inventors: Hyuk Min Lee, Yongin-si (KR); Hyun Soo Lee, Yongin-si (KR); In Heum Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 155 days.

(21) Appl. No.: 14/667,306

(22) Filed: Mar. 24, 2015

(65) Prior Publication Data

US 2015/0276161 A1 Oct. 1, 2015

(30) Foreign Application Priority Data

Mar. 25, 2014 (KR) ........................ 10-2014-0034509

(51) Int. Cl.
*G01B 13/18* (2006.01)
*F21S 8/10* (2006.01)

(52) U.S. Cl.
CPC ......... *F21S 48/1752* (2013.01); *F21S 41/147* (2018.01); *F21S 41/255* (2018.01); *F21S 41/295* (2018.01); *F21S 41/321* (2018.01); *F21S 41/332* (2018.01); *F21S 41/333* (2018.01); *F21S 41/336* (2018.01); *F21S 41/338* (2018.01); *F21S 41/43* (2018.01); *F21S 41/663* (2018.01); *F21S 45/47* (2018.01)

(58) Field of Classification Search
CPC ............... F21S 48/1388; F21S 48/1747; F21S 48/1784; B60Q 1/06; B60Q 1/068; B60Q 1/0683; B60Q 1/0686; B60Q 1/076; B60Q 1/08; B60Q 1/122; B60Q 1/124
USPC .......................................................... 362/460
See application file for complete search history.

(56) References Cited

U.S. PATENT DOCUMENTS

2005/0083702 A1* 4/2005 Nishimura ............... B60Q 1/12 362/464
2013/0107564 A1* 5/2013 Yatsuda .................. F21S 48/32 362/543
2013/0188378 A1* 7/2013 Yamamoto ............. F21V 13/04 362/512

FOREIGN PATENT DOCUMENTS

KR 10-2014-0015029 2/2014

* cited by examiner

*Primary Examiner* — Bao Q Truong
*Assistant Examiner* — Matthew Peerce
(74) *Attorney, Agent, or Firm* — H.C. Park & Associates, PLC

(57) ABSTRACT

A head lamp includes a plate-shaped base supported in a housing. A first light source is disposed on an upper surface of the base. A second light source is disposed on a lower surface of the base. An upper reflector extends from the upper surface of the base and is configured to reflect incident light emitted from the first light source in a forward direction. A lower reflector extends from the lower surface of the base and is configured to reflect light emitted from the second light source in the forward direction. A shield main body extends from an end of the base and is configured to: block a portion of light reflected from the upper reflector and the lower reflector, and form a beam pattern. A shield protrusion protrudes from the shield main body and is configured to block another portion of the light reflected by the lower reflector.

15 Claims, 2 Drawing Sheets

HEAD LAMP FOR VEHICLE

CROSS-REFERENCE TO RELATED APPLICATIONS

This application claims priority from and the benefit of Korean Patent Application No. 10-2014-0034509, filed on Mar. 25, 2014, which is incorporated herein by reference for all purposes as if fully set forth herein.

BACKGROUND

Field

Exemplary embodiments relate to a head lamp for a vehicle. More particularly, exemplary embodiments relate to a head lamp for a vehicle, which includes a single projection unit, and is configured to provide both an adaptive drive beam (ADB) and a dynamic bending light (DBL).

Discussion of the Background

Lamps for a vehicle are typically classified into head lamps, which are installed at a front side of the vehicle, and tail lamps, which are installed at a rear side of the vehicle. The head lamps are usually mounted at both sides (e.g., right and left sides) of the front side of the vehicle. The head lamps are designed to increase visibility of a driver in a traveling direction when the vehicle travels, for instance, at night or in other low ambient light conditions.

Head lamps may be configured to be moved in up and down directions or in left and right directions depending on a driving environment. For example, when the vehicle moves along a curved road, the head lamp may be rotated along the driving direction so as to help provide visibility for the driver. Meanwhile, a part of a region illuminated by a high beam may be shielded in accordance with a position of an oncoming vehicle that travels in the opposite direction, thereby preventing light blindness of a driver in the oncoming vehicle.

FIG. 1 is a perspective view of a head lamp for a vehicle. The head lamp includes a low focus lamp 2, an L-shape lamp 3, a low wide lamp 4, and a high beam lamp 5. The low focus lamp 2 and the L-shape lamp 3 are operated as rotary modules. The low wide lamp 4 and the high beam lamp 5 are operated as fixed modules. It is also noted that the head lamp in FIG. 1 may include swivel actuators (not shown) and optical units (not illustrated), which are provided on the rotary modules, so as to be operated as an adaptive driving beam (ADB) lamp. It is noted, however, that the existing lamp design mostly includes a single projection unit, and, as a result, the aforementioned configuration including two optical units cannot be adopted to the existing lamp design.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an effort to incorporate an adaptive driving beam (ADB) lamp unit and a dynamic bending light (DBL) lamp unit into a single projection unit.

Additional aspects will be set forth in the detailed description which follows, and, in part, will be apparent from the disclosure, or may be learned by practice of the inventive concept.

According to exemplary embodiments, a vehicular head lamp includes: a housing; a base supported in the housing, the base including a plate shape; a first light source disposed on an upper surface of the base; a second light source disposed on a lower surface of the base; an upper reflector extending from the upper surface of the base, the upper reflector being configured to reflect light emitted from the first light source in a forward direction; a lower reflector extending from the lower surface of the base, the lower reflector being configured to reflect incident light emitted from the second light in the forward direction; a shield main body extending from an end of the base, the shield main body being configured to: block a portion of light reflected from the upper reflector and the lower reflector, and form a beam pattern; and a shield protrusion protruding from the shield main body, the shield protrusion being configured to block another portion of light reflected by the lower reflector.

According to exemplary embodiments, the vehicular head lamp is configured to incorporate an adaptive driving beam (ADB) lamp unit and a dynamic bending light (DBL) lamp unit into one projection unit. It is also configured to improve design of freedom by incorporating the lamp units. Exemplary embodiments also enable simplification of manufacturing and operating processes by reducing the number of swivel actuators, and reduce costs by reducing the number of components.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
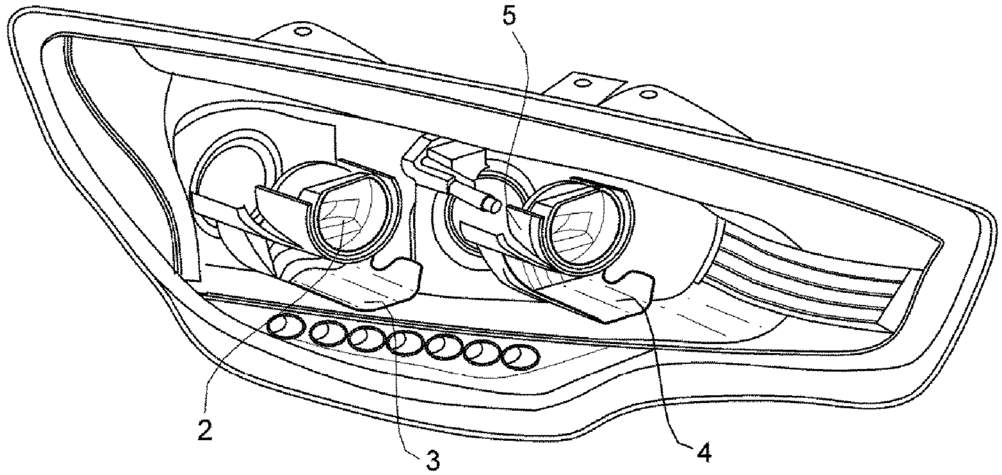
FIG. 1 (Related Art)
FIG. 1 is a perspective view of a related-art head lamp for a vehicle.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. As such, the accompanying figures are not necessarily to scale, and present a somewhat simplified representation of various features illustrative of the basic principles of exemplary embodiments described herein. Specific design features, including, for example, specific dimensions, orientations, locations, and shapes will be determined, in part, by the particular application and environment in which embodiments described herein are unutilized.

In the figures, reference numbers refer to the same or equivalent parts of the present invention throughout the several figures of the drawing Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
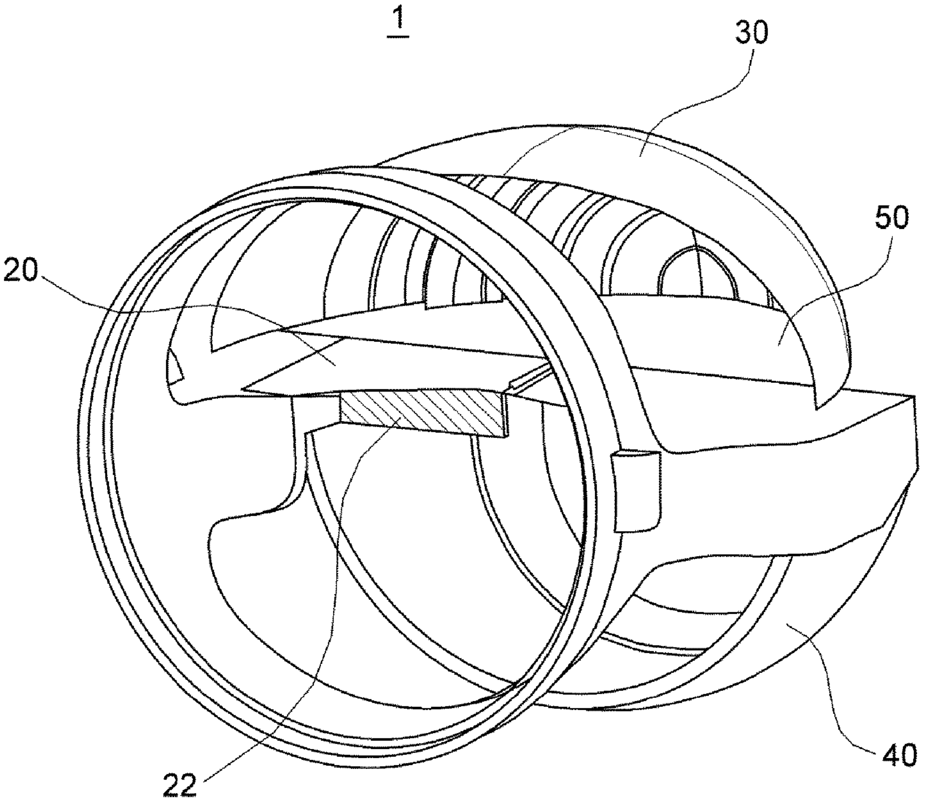
FIG. 2 is a perspective view of a head lamp for a vehicle, according to one or more exemplary embodiments.
Figure 3:
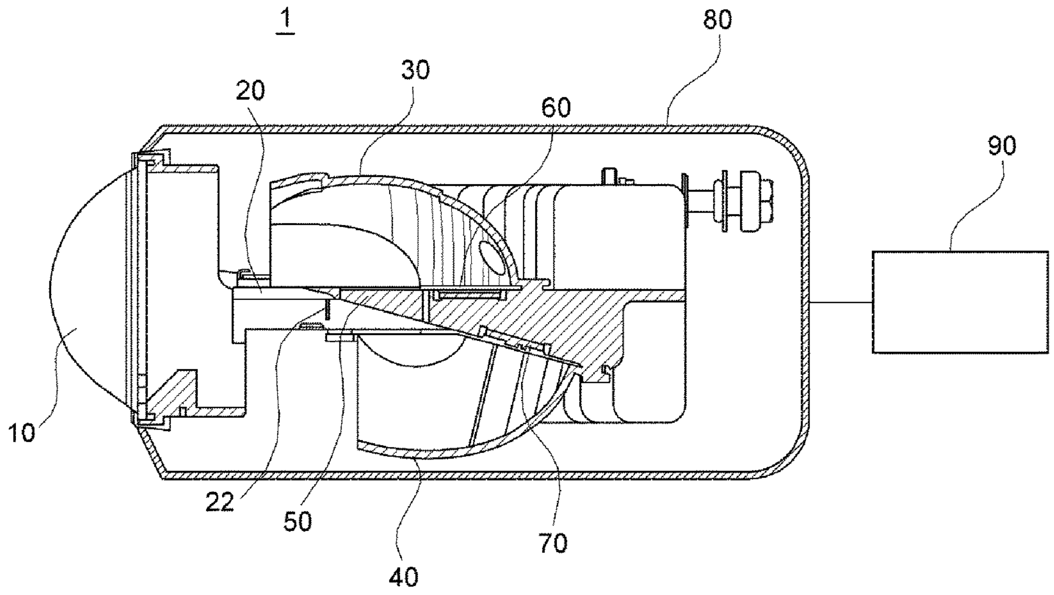
FIG. 3 is a cross-sectional view of the head lamp of FIG. 2, according to one or more exemplary embodiments.
Figure 4:
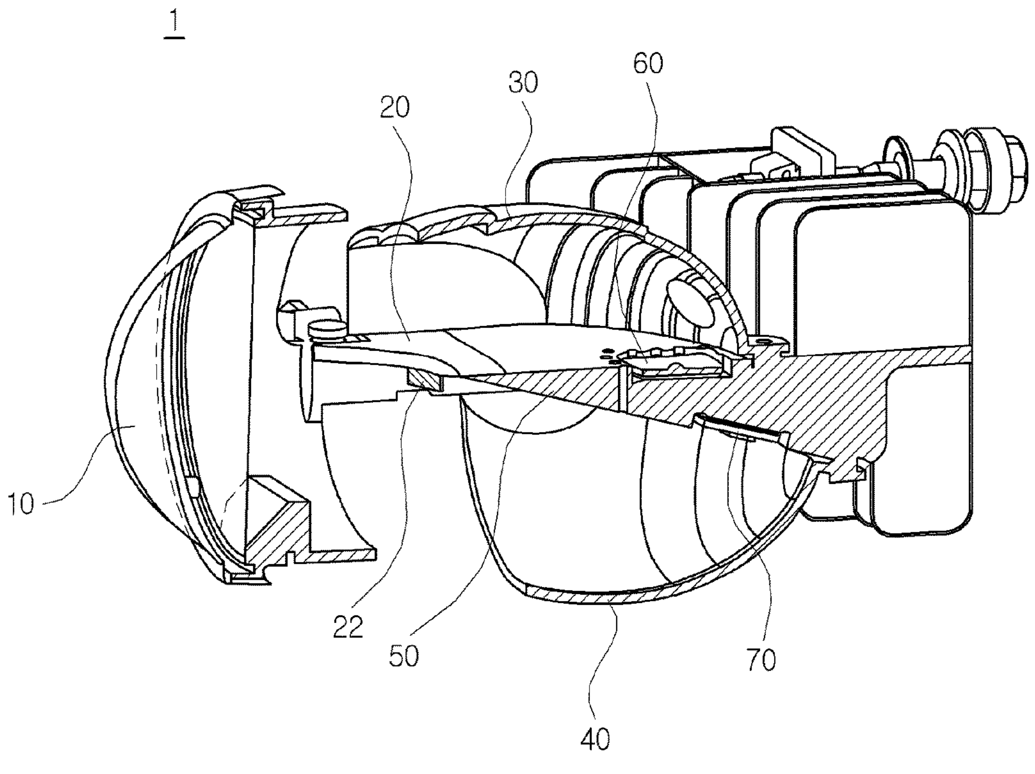
FIG. 4 is a cross-sectional perspective view of the head lamp of FIG. 2, according to one or more exemplary embodiments.

FIG. 2 is a perspective view of a head lamp for a vehicle, according to one or more exemplary embodiments. FIG. 3 is a cross-sectional view of the head lamp of FIG. 1, according to one or more exemplary embodiments. FIG. 4 is a cross-sectional perspective view of the head lamp of FIG. 1 according to one or more exemplary embodiments.

Referring to FIGS. 2 to 4, head lamp 1 for a vehicle may include a head lamp housing 80, base 50, first light source 60, second light source 70, upper reflector 30, lower reflector 40, shield main body 20, and shield protrusion 22.

The head lamp housing 80 may be disposed at the front side of the vehicle to provide a space in which constituent elements of head lamp 1 are accommodated. The head lamp housing 80 may be variously modified in accordance with sizes and shapes of the constituent elements and the vehicle in which the head lamp is to be installed.

Base 50 is positioned in the head lamp housing 80, and divides an internal space in the head lamp housing 80 into an upper space and a lower space. The base 50 may be formed in a plate shape. In an exemplary embodiment, an upper surface of the base 50 may be formed to be horizontal (or substantially horizontal), and a lower surface of the base 50 may be formed to form an acute angle with respect to the upper surface of the base 50. The upper surface of the base 50 includes a seating portion, in which first light source 60 may be mounted, and the lower surface of the base 50 includes a seating portion, in which second light source 70 may be mounted.

First light source 60 is positioned in the seating portion of the first light source 60, which is provided in the upper surface of the base 50. Second light source 70 is positioned in the seating portion for the second light source 70, which is provided in the lower surface of the base 50. First light source 60 and second light source 70 may be implemented as any suitable type of light source device, which may be used within the technical field in which the light source device supplies light required to distribute light in the head lamp 1 for a vehicle. In an exemplary embodiment, first light source 60 and second light source 70 may be configured as one or more light emitting diodes (LEDs), respectively. First light source 60 may be disposed on base 50 so as to be closer to the front side of head lamp 1 than second light source 70. Namely, first light source 60 may be disposed closer to lens 10 than second light source 70.

Head lamp 1, in which light emitting elements, such as LEDs are incorporated, may obtain a light source with high brightness, but when an operational temperature is increased, light emitting efficiency of the light emitting elements may be decreased. Therefore, base 50 may also be configured as a heat sink plate to discharge undesirable heat from the sealed interior of head lamp 1. For instance, fins of the heat sink plate may be disposed at a rear portion of head lamp 1 outside the sealed interior region of head lamp 1. In this manner, heat may be transferred from the sealed interior region through the body of base 50 to an ambient environment via the fins extending from base 50 outside the sealed interior region. It is noted that the disposition of the fins at a rear portion of head lamp 1 may prevent (or otherwise reduce) optical distortion of light emitted from head lamp 1. It is also contemplated that a separate heat sink plate may be coupled to base 50 or otherwise incorporated as part of head lamp 1.

Although not illustrated, first light source 60 and second light source 70 are configured to be turned on and off (or otherwise controlled) by a control unit (not illustrated). The control unit may be responsive to inputs provided by a driver of a vehicle or may be responsive to ambient conditions, e.g., lighting conditions, weather conditions, oncoming traffic conditions, etc.

Upper reflector 30 is positioned above first light source 60, and reflects incident light emitted from first light source 60 toward the front side of head lamp 1, e.g., towards lens 10. In an exemplary embodiment, upper reflector 30 may have an elliptical shape having a bent (or arcuate) cross sectional configuration, and a bent (or curved) surface of upper reflector 30 may be in contact with the upper surface of base 50. This configuration may improve efficiency in reflecting light emitted from first light source 60. Lower reflector 40 is positioned below second light source 70, and reflects incident light emitted from second light source 70 toward the front side of head lamp 1, e.g., towards lens 10. In an exemplary embodiment, lower reflector 40 may have an elliptical shape having a cross sectional configuration that is bent (or otherwise arcuately formed), and a bent (or curved) surface of the lower reflector 40 may be in contact with the lower surface of the base 50. This configuration may improve efficiency in reflecting light emitted from second light source 70.

Upper reflector 30 and lower reflector 40 serve to prevent (or reduce) a loss of light emitted from first light source 60 and second light source 70. In this manner, upper reflector 30 and lower reflector 40 may be configured to increase the amount of light directed towards lens 10. It is noted, however, that the shape of the upper and lower reflectors 30 and 40 is not limited to those illustrated. Furthermore, the upper and lower reflectors 30 and 40 may be formed from any suitable material with relatively high reflectivity. For example, the material may include at least one of silver (Ag), aluminum (Al), an Ag alloy, an Al alloy, etc.

Shield main body 20 extends from one end of the base 50 and blocks a part of light reflected by upper reflector 30 and lower reflector 40. In this manner, shield main body 20 may form a beam pattern with the light emitting from first light source 60 and/or second light source 70. Shield main body 20 may be variously modified in accordance with the shape of the beam pattern, and, in an exemplary embodiment, the shield main body 20 may be formed in a curved shape.

Shield protrusion 22 is provided on shield main body 20, and has a structure that allows part of the light reflected by lower reflector 40 to pass over shield protrusion 22, and blocks another part of the light reflected by lower reflector 40. In an exemplary embodiment, the shield protrusion 22 may have a quadrangular cross section, or may be variously modified to be formed in a shape that blocks light. In the case of a right head lamp, the structure for blocking light may be disposed at a left side when viewing the head lamp module from the front side of a vehicle incorporating the head lamp module. In the case of a left head lamp, the structure for blocking light may be disposed at a right side of the head lamp module when viewed from the front side of a vehicle incorporating the head lamp module.

The head lamp housing 80 may be rotated by a swivel actuator 90, and the swivel actuator 90 may be variously modified in the technical field in which head lamp 1 is rotated. It is noted that the aforementioned control unit may be configured to control the swivel actuator 90 in accordance with one or more inputs provided by a driver of a vehicle or in accordance with one or more detected ambient conditions, e.g., lighting conditions, weather conditions, oncoming traffic conditions, etc.

Light emitted from first light source 60 may form a low beam by being reflected by upper reflector 30, and light emitted from second light source 70 may form an adaptive drive beam (ADB) by being reflected by lower reflector 40.

In a dynamic bending light (DBL) unit, only first light source 60 below upper reflector 30 is turned on. In this manner, if a separately included short-distance lighting module is provided in association with the vehicle including head lamp 1, the short-distance lighting module may also be turned on. Therefore, the low beam may be formed by turning on first light source 60, and when the vehicle turns in a direction in which the road is curved, it is possible to ensure visibility for the driver within a short-distance region from the front side of the vehicle by an operation of the swivel actuator 90.

In association with an adaptive drive beam (ADB) unit, only second light source 70 above lower reflector 40 may be turned on, or both first light source 60 and second light source 70 may be turned on. Second light source 70 illuminates a front long-distance region, and blocks light in a specific region, thereby preventing light blindness of drivers in oncoming vehicles in, for instance, an opposing lane. Head lamp 1 may be rotated along a path along which the oncoming vehicle moves, thereby more effectively preventing light blindness of the driver in the oncoming vehicle.

Accordingly, head lamp 1 for a vehicle may be operated as both an adaptive drive beam (ADB) unit and a dynamic bending light (DBL) unit using one swivel actuator 90.

A lens 10 is made of a light transmissive material, and provided at a portion in a direction in which light is emitted from first light source 60 and second light source 70.

According to exemplary embodiments, it is possible to incorporate an adaptive driving beam (ADB) lamp unit and a dynamic bending light (DBL) lamp unit into one projection unit. It is also possible to improve a degree of design freedom by incorporating the lamp units in various housing configurations. It is also possible to simplify manufacturing processes by reducing the number of swivel actuators, and reduce costs by reducing the number of components.

Although certain exemplary embodiments and implementations have been described herein, other embodiments and modifications will be apparent from this description.

Accordingly, the inventive concept is not limited to such embodiments, but rather to the broader scope of the presented claims and various obvious modifications and equivalent arrangements.

What is claimed is:

1. A vehicular head lamp comprising:

a housing;

a swivel actuator to rotate the housing, the swivel actuator comprising an adaptive drive beam (ADB) unit and a dynamic bending light (DBL) unit integrated as a single projector;

a base supported in the housing, the base comprising a plate shape;

a first light source disposed on an upper surface of the base;

a second light source disposed on a lower surface of the base;

an upper reflector extending from the upper surface of the base, the upper reflector being configured to reflect incident light emitted from the first light source in a forward direction;

a lower reflector extending from the lower surface of the base, the lower reflector being configured to reflect incident light emitted from the second light source in the forward direction;

a shield main body extending from an end of the base, the shield main body being configured to:

block a portion of light reflected from the upper reflector and the lower reflector, and form a beam pattern; and a shield protrusion protruding from the shield main body, the shield protrusion being configured to block another portion of light reflected by the lower reflector, wherein a rearmost reflecting portion of a surface of the upper reflector is disposed closer to the shield main body than a rearmost reflecting portion of a surface of the lower reflector, wherein a side of the shield main body extends on substantially the same plane as the upper surface of the base.

2. The vehicular head lamp of claim 1, wherein the shield main body has a curved shape.

3. The vehicular head lamp of claim 1, wherein at least one of the first light source and the second light source comprises a light emitting diode (LED).

4. The vehicular head lamp of claim 1, wherein:

the upper surface of the base extends in a substantially horizontal direction; and the lower surface of the base extends in a direction crossing the substantially horizontal direction.

5. The vehicular head lamp of claim 4, wherein the lower surface forms an acute angle with respect to the upper surface.

6. The vehicular head lamp of claim 1, wherein the first light source and the second light source are configured to operate separately from one another.

7. The vehicular head lamp of claim 1, wherein the shield protrusion is disposed at a side of the vehicular head lamp.

8. The vehicular head lamp of claim 1, further comprising:

a lens disposed in the forward direction, such that light reflected from the upper reflector and lower reflector propagates through the lens into an ambient environment.

9. The vehicular head lamp of claim 1, wherein the base comprises a heat sink plate.

10. The vehicular head lamp of claim 9, wherein the heat sink plate comprises fins extending from a main body of the base.

11. The vehicular head lamp of claim 1, wherein:

light emitted from the first light source forms a low beam; and light emitting from the second light source forms an adaptive drive beam (ADB) pattern.

12. The vehicular head lamp of claim 1, wherein a rearmost surface of the second light source is disposed closer to the shield main body than the rearmost reflecting portion of the surface of the lower reflector.

13. The vehicular head lamp of claim 1, wherein a rearmost surface of the first light source is disposed closer to the shield main body than the rearmost reflecting portion of the surface of the upper reflector.

14. The vehicular head lamp of claim 1, wherein the lens is supported in a lens housing coupled to the base.

15. The vehicular head lamp of claim 1, wherein the upper reflector and the lower reflector comprise arcuate reflective surfaces.

* * * * *